(12) United States Patent
Chalamala et al.

(10) Patent No.: US 9,144,022 B2
(45) Date of Patent: Sep. 22, 2015

(54) SYSTEM AND METHOD FOR CALL ROUTING FOR EFFICIENT USE OF TELECOMMUNICATION SPECTRUM

(75) Inventors: Srinivasa Rao Chalamala, Hyderabad (IN); Krishna Rao Kakkirala, Hyderabad (IN)

(73) Assignee: TATA CONSULTANCY SERVICES LIMITED, Mumbai, Maharashtra (IN)

( * ) Notice: Subject to any disclaimer, the term of this patent is extended or adjusted under 35 U.S.C. 154(b) by 455 days.

(21) Appl. No.: 13/352,510

(22) Filed: Jan. 18, 2012

(65) Prior Publication Data

US 2013/0077787 A1    Mar. 28, 2013

(30) Foreign Application Priority Data

Sep. 28, 2011 (IN) .......................... 2732/MUM/2011

(51) Int. Cl.
*H04W 52/02* (2009.01)
*H04W 12/06* (2009.01)

(52) U.S. Cl.
CPC ...... *H04W 52/0251* (2013.01); *H04W 52/0219* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 5,737,687 A * | 4/1998 | Martin et al. | 455/14 |
| 6,370,394 B1 | 4/2002 | Anttila | |
| 6,681,118 B2 | 1/2004 | Raffel et al. | |
| 2002/0131387 A1* | 9/2002 | Pitcher et al. | 370/338 |
| 2008/0113692 A1* | 5/2008 | Zhao et al. | 455/574 |
| 2012/0020293 A1* | 1/2012 | Nix et al. | 370/328 |
| 2013/0177005 A1* | 7/2013 | Hicks et al. | 370/338 |

FOREIGN PATENT DOCUMENTS

EP        0740482 A1    10/1996

* cited by examiner

*Primary Examiner* — Ayaz Sheikh
*Assistant Examiner* — Sori Aga
(74) *Attorney, Agent, or Firm* — Thompson Hine LLP

(57) ABSTRACT

The present invention relates to a system and method for routing a data from one or more mobile communication channel to one or more fixed communication channel in a resource efficient manner. The delinking router of the system communicates with the one or more mobile communication channel and with one or more fixed communication channel and transmits the request to a Base Transmitting Station (BTS) for routing the data from the mobile communication channel to the fixed communication channel. The delinking router also reduces energy and spectrum consumption of the mobile communication channel by turning off its radio frequency module after routing its data to the fixed communication channel.

22 Claims, 5 Drawing Sheets

SYSTEM AND METHOD FOR CALL ROUTING FOR EFFICIENT USE OF TELECOMMUNICATION SPECTRUM

FIELD OF THE INVENTION

The present invention relates to the field of telecommunication. More particularly, the invention relates to a system and method for saving the power and energy consumption by routing a data from one communication channel to another.

BACKGROUND OF THE INVENTION

The discovery of mobile phones has provided a lot of convenience in overall calling system. It provides user a freedom to operate the communication device in an unlimited region. On the other hand, telephone network is a fixed communication device which means a network of wires to which a telephone is connected. Although, a user prefers to keep mobile phone but fixed telephone network is also preferred for some beneficial purpose. A user having a cellular phone with wireless system usually has an additional fixed telephone for in-house use. Management of a plurality of communication device is problematic for a user as he has to remember a plurality of numbers and he is also concerned about battery consumption. Usage of plurality of communication device may also result in wastage of frequency spectrum.

Many of the system and methods have been proposed to provide user a convenience in keeping a plurality of communication devices by routing call from one communication device to another. One of the basic methods is call diverting. However, this method has a disadvantage that the urgent calls may get missed as a user cannot answer any call when it is diverted. This method does not result in reduced consumption of frequency spectrum. Also, a user has to request his service provider for accessing the service of call diverting for which he has to pay an additional amount of money. U.S. Pat. No. 6,681,118 titled, "Method for providing cellular and landline cordless service using a dual mode mobile telephone" also discloses a mobile station which communicates with both a cellular network and a cordless cellular base station. The cordless cellular base station is preferably connected to a public switched and is assigned a landline number. The cordless cellular base station acts as a conduit between the mobile station and the public switched telephone network. However, the invention does not talk about reduced bandwidth consumption or power consumption.

Therefore, a system is needed which is capable of routing call from one communication device to another by saving the power and frequency spectrum. The system should be cost efficient such that it could be implemented at macro as well as micro level for routing data from one communication device to another.

OBJECTIVES OF THE INVENTION

It is the primary objective of the invention to route the data on one communication channel to the other communication channel.

It is an objective of the invention to reduce the consumption of power and frequency spectrum by routing the data from one communication channel to the other communication channel.

It is yet another objective of the invention to provide a cost efficient system to be implemented at micro as well as macro level.

It is yet another objective of the invention to provide a system capable of providing broadband service to a plurality of users.

SUMMARY OF THE INVENTION

The invention discloses a system for reducing energy and spectrum consumption by routing a data from one or more mobile communication channel to one or more fixed communication channel in a resource efficient manner. The system comprises of a delinking router configured to detect and identify one or more mobile communication channel in a predetermined spectrum range and in a predetermined distance range and is configured for enabling efficient use of frequency radio spectrum throughout the system. The delinking router further comprises of a first communication module for enabling communication between the delinking router and the mobile communication device, one or more communication ports to connect the one or more mobile communication device and the one or more fixed communication device to the delinking router, an interface for receiving one or more authentication information from the mobile communication device, a computer readable memory means for storing one or more predetermined authentication, encryption and decryption information about the one or more mobile communication device and a processor for identifying the received authentication information from the mobile communication device with respect to the stored predetermined authentication information. The system further comprises of a control and authentication module configured to further transmit the authentication information to a Base Transmitting Station (BTS), a switching device for controlling the one or more mobile device to turn off its radio module and a second communication module for enabling communication between the delinking router and the fixed communication device in order to route the data to the fixed communication device. The system routes the data from the mobile communication device to the fixed communication device and connects to a Base Transmitting Station (BTS) wherein the Base Transmitting Station (BTS) further transmits the authentication information to a Base Station Controller (BSC) such that the Base Station Controller (BSC) identifies the mobile communication device in cooperation with an authentication server and then authenticates the Base Transmitting Station (BTS) to check the request for routing the data from the mobile communication channel to the fixed communication channel by modifying its configuration.

The present invention also discloses a method for reducing energy and spectrum consumption by routing a data from one or more mobile communication channel to one or more fixed communication channel in a resource efficient manner. The method comprises of processor implemented steps of detecting one or more mobile communication channel in a predetermined range, receiving one or more authentication information from the detected mobile communication device for identifying it and transmitting the authentication information to a Base Transmitting Station (BTS) such that the Base Transmitting Station (BTS) further transmits the received authentication information to the Base Station Controller (BSC) for identifying the mobile communication device. The method further comprises of transmitting the request of routing the data back to the Base Transmitting Station (BTS) after identifying the mobile communication device for changing the routing of data from the mobile communication channel to the fixed communication channel and transmitting the authentication for routing the data to the Base Transmitting Station (BTS) which further disconnects the mobile communication channel from receiving the data via the delinking router and routes the data to the fixed communication channel.

DETAILED DESCRIPTION OF THE INVENTION

Some embodiments of this invention, illustrating its features, will now be discussed:

The words "comprising", "having", "containing", and "including", and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a", "an", and "the" include plural references unless the context clearly dictates otherwise. Although any systems, methods, apparatuses, and devices similar or equivalent to those described herein can be used in the practice or testing of embodiments of the present invention, the preferred, systems and parts are now described.

The disclosed embodiments are merely exemplary of the invention, which may be embodied in various forms.

The present invention discloses a system and a method for routing a data from one or more communication channel to another communication channel. The routing of data is performed in a manner to reduce energy and spectrum consumption by switching off the one or more communication channel. The information from one or more communication channel is processed for its identification and after getting authentication the data is routed from that communication channel to another communication channel.

Figure 1:
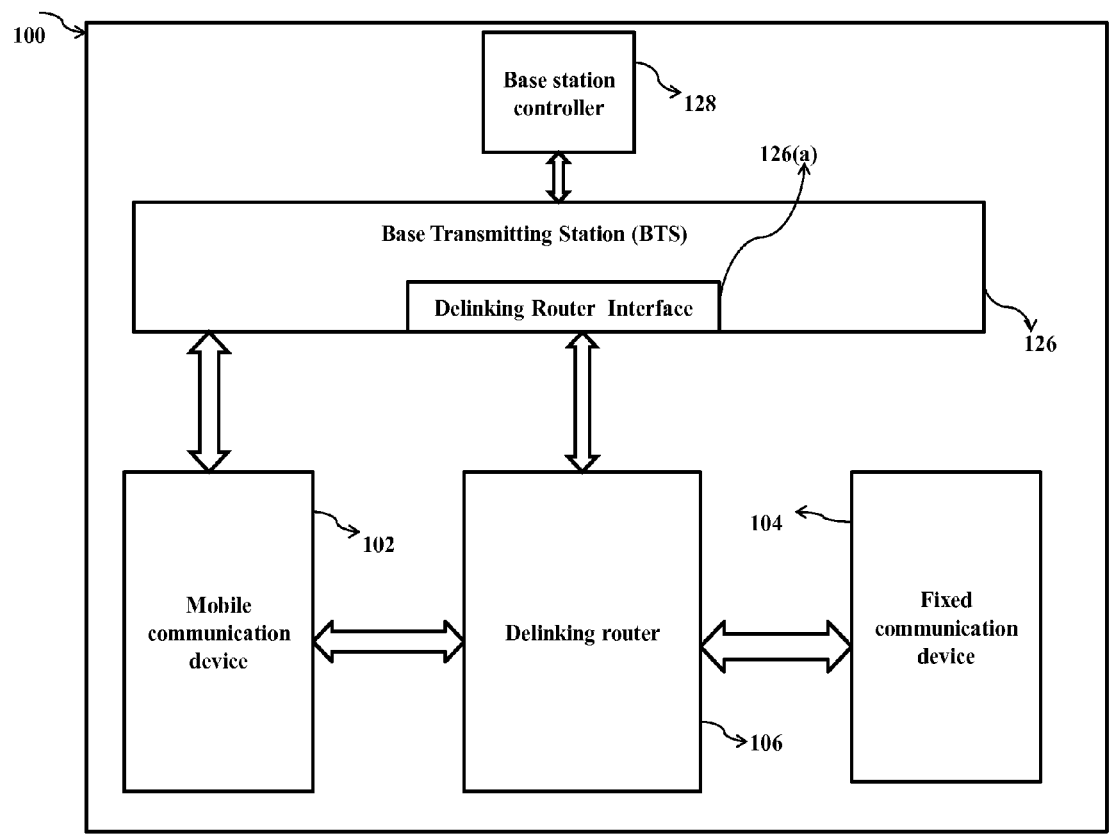
FIG. 1 illustrates the general architecture in accordance with an embodiment of the invention.

In accordance with an aspect, referring to FIG. 1, the system (100) for switching data communication mode from wireless to wired when the mobile communication device is at a fixed for a long time. The system (100) disables one or more mobile communication device (102) and activates one or more fixed communication device (104) or vice versa comprises of a delinking router (106) and other components implemented for communication and processing of the data throughout the system (100).

Figure 2:
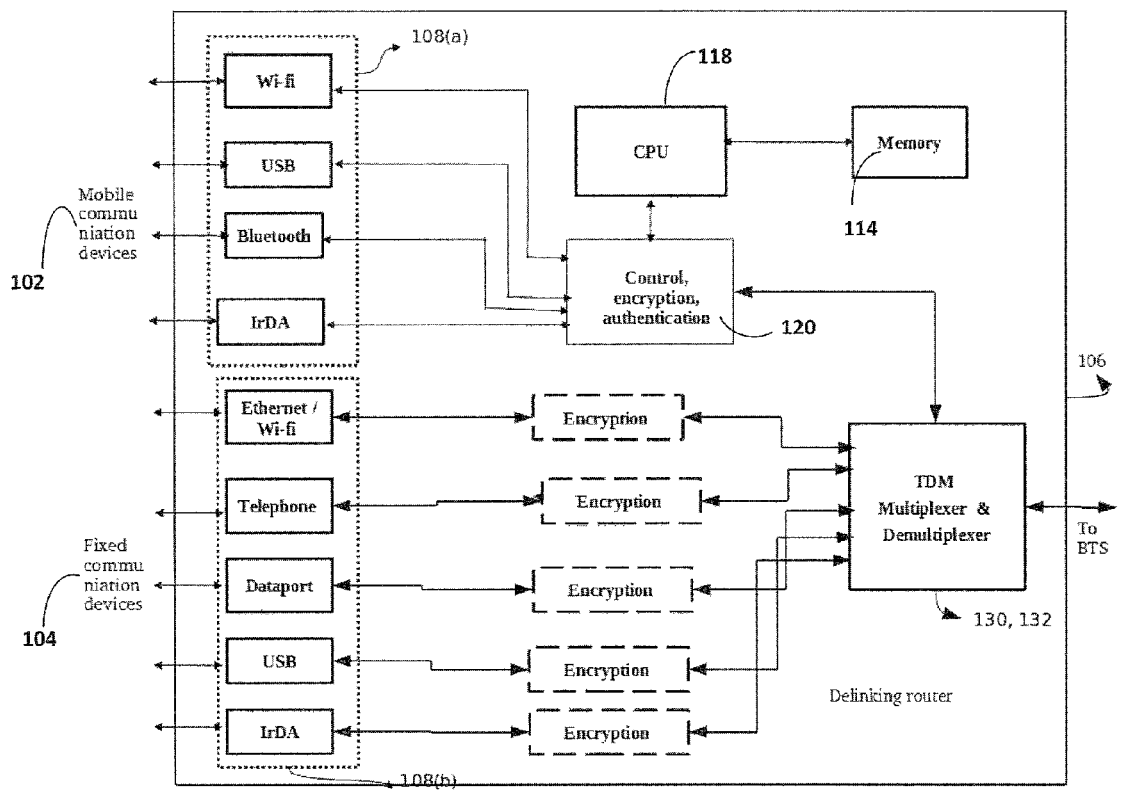
FIG. 2 illustrates the detailed architecture of the one or more components of the system in accordance with the primary embodiment of the invention.
Figure 3:
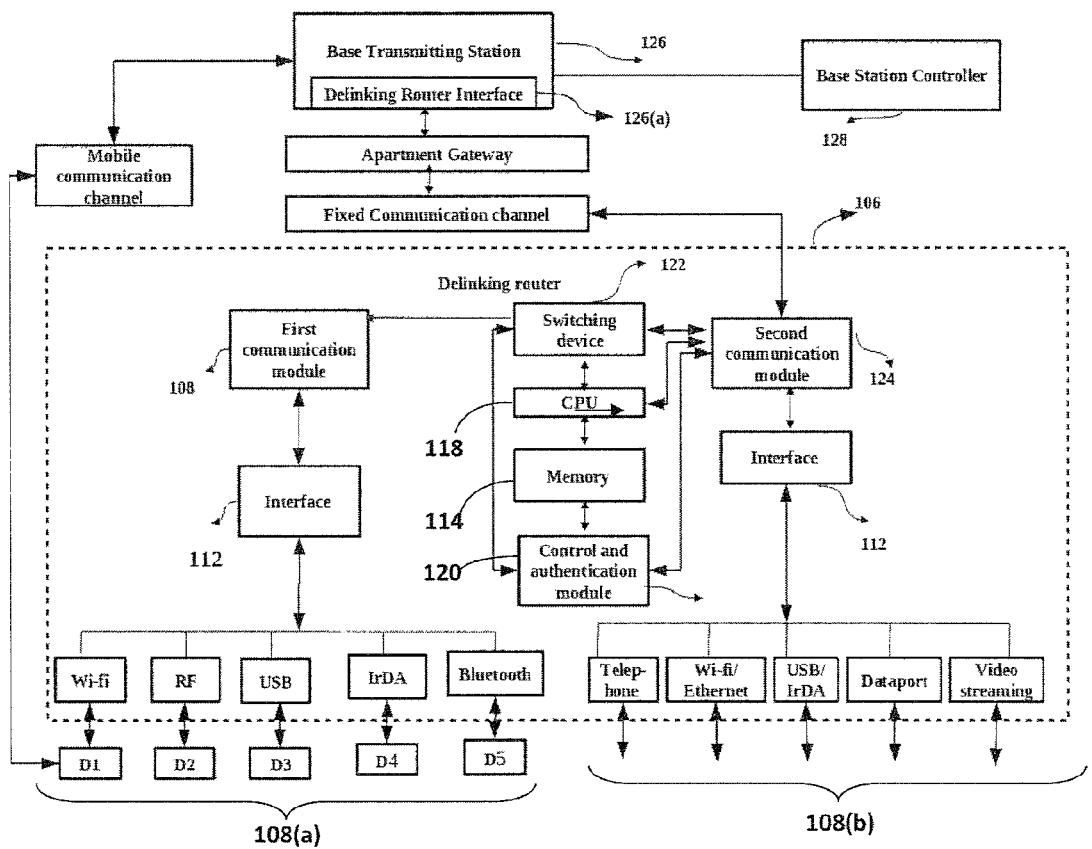
FIG. 3 illustrates the architecture of the system in accordance with an alternate embodiment of the system.

Referring to FIG. 2, the delinking router (106) is the core component communicating with both the mobile communication device (102) and the fixed communication device (104) for routing the data among them after identification and authentication. The delinking router (106) is configured to detect and identify the presence or absence of the one or more mobile communication device (102) in a predetermined spectrum range and in a predetermined distance range. FIG. 3 illustrates functionalities of the delinking router (106) along with the other components. As shown in FIG. 3, the delinking router (106) comprises of a first communication module (108) for enabling the communication between the delinking router (106) and the mobile communication device (102). The delinking router (106) further includes one or more communication ports (110) for physically connecting the mobile communication device (102) and the fixed communication device (104). The first communication module (108) includes wired communication, wireless communication or a combination thereof.

Still referring to FIG. 3, the delinking router (106) further comprises of an interface (112) for receiving one or more authentication information from the one or more mobile communication device (102). When the mobile communication device (102) is connected to the delinking router (106) through one of its communication port (110) then the delinking router (106) starts receiving one or more authentication information from the mobile communication device (102). The authentication information consists of ESN number, TMSI number, IMSI number or a combination thereof.

The authentication information received from the mobile communication device (102) is further used for identifying the user of the mobile communication device (102). The delinking router (106) further includes a computer readable medium or a memory (114) for storing the predetermined information related to the one or more mobile communication device (102). The delinking router (106) compares the received authentication information from the mobile communication device (102) with the predetermined information stored in the computer readable medium (114) for identifying the user of the mobile communication device (102). When the delinking router (106) identifies and detects the presence or absence of the mobile communication device (102) it further processes the received authentication information.

In accordance with an embodiment, referring to FIG. 3, the mobile communication device and the fixed communication device further comprises of an encipherment module for supporting cipher or keys required for encryption, decryption and authentication of the user by means of one or more algorithm. The authentication information of the mobile communication device used for the identification of the user of the mobile communication device. The authentication process is similar to the one used in GSM and UMTS except it can be done both with wireless and wired mode. The cipher or keys required for includes a Ki individual subscriber authentication key, Kc 64-bit ciphering key, K subscriber authentication key, CK encryption key, IK integrity key, SQNms sequence number information or a combination thereof. The algorithm utilized for performing encryption. Decryption and authentication included A3 algorithm of GSM for computing SRES, A8 algorithm of GSM for computing Kc, A5 algorithm of GSM for ciphering and deciphering the data, f1-f9 algorithms of UMTS or a combination thereof.

Again referring to FIG. 3, the delinking router (106) further comprises of a processor or a CPU (118) in communication with the computer readable medium (114) is configured for identifying the information received from the mobile communication device (102) for identifying it. The processor (118) verifies the authentication information with respect to the predetermined information stored in the computer readable medium (114). The processor (118) also runs all the software required to communicate with the Base Transmitting Station BTS (126).

The delinking router (106) further comprises of a control and authentication module (120) for further transmitting the authentication information along with a request of routing the data from one or more mobile communication device (102) to the fixed communication device (104) to a respective Base Transmitting Station (BTS) (126) through the interface (126a). The Base Transmitting Station (BTS) (126) is responsible for accepting or rejecting the request for routing the data. The Base Transmitting Station (BTS) (126) further transmits the authentication information to a corresponding Base Station Controller (BSC) (128) for identifying the mobile communication device (102). The Base Station Controller (BSC) (128) further transmits the data to an authentication server such that the authentication server verifies the information of the user of a particular mobile communication device (102) and after verifying the authentication information the authentication server transmits back the response to the delinking router (106) through the Base Station Controller (128) and the Base Transmitting Station (BTS) (126) when the delinking router (106) transmits its response in the form of SRES. When the authentication process is over the routing request is processed by the Base Transmitting Station (BTS) (126) to route the data from the mobile communication channel (102) to the fixed communication channel (104). The Base Transmitting Station (BTS) then transmits a message of accepting the request for routing the data to the delinking router (106) once the request is accepted the Base Transmitting Station (BTS) (126) and the delinking router (106) send and receive all kinds of data on fixed communication channel. In the event of rejection only the authentication and routing requests are accepted by the Base Transmitting Station (BTS) (126) on this fixed communication channel via the interface (126a). The Base Transmitting Station (BTS) (126) further modifies its configurations by changing its network settings such that it can route the data of the mobile communication device (102) to the fixed communication device (104).

In accordance with an embodiment, referring to FIG. 3, the Base Transmitting Station (BTS) (126) includes a delinking interface (126a) for communication with the delinking router (106) or apartment gateway directly. When the delinking router is embedded inside one or more mobile communication device (102) (not shown in figure) it acts as both like the mobile communication device and the fixed communication device by connecting it to a fixed communication channel and switching off its RF section. When the delinking router (106) is embedded inside a mobile communication device (not shown in figure), the Base Transmitting Station (126) will communicate via wireless or wired communication means or both directly to the mobile communication device (102) particularly while an authentication request is pending with the Base Transmitting Station (BTS) (126) and upon receipt of that authentication request, the mobile communication device (102) will communicate with the Base Transmitting Station (BTS) (126) through a wired communication or a wireless communication channel or both.

In accordance with an embodiment, the mobile communication device (102) and the fixed communication device (104) are assigned a common number. In cellular communication each mobile communication device (102) is assigned a number based on the IMSI number of the subscriber identity module (SIM) and is stored in home Location Register (HLR). As the delinking router (106) registers itself with the IMSI of the mobile communication channel (102) and the Base Transmitting Station (BTS) (126) and the Base Station Controller (BSC) (128) performing the process of authentication are unaware of whether it is coming from the mobile communication device (102) or the fixed communication device (104), all data will be accepted and routed.

The data routed from the mobile communication device (102) to the fixed communication device (104) includes voice calls, video calls, data calls or a combination thereof.

Again referring to FIG. 3, the delinking router (106) further comprises of a switching device (122) for switching off the radio frequency module of the mobile communication device (102). When the delinking router (106) receives the message of accepting the request for routing the data from the Base Transmitting Station (BTS) (126), it instruct its switching device (122) for switching off the radio frequency module of the mobile communication device (102) in order to reduce the consumption of power and frequency spectrum. The amount of radio frequency consumed by the mobile communication device (102) varies for different mobile communication device (102). Also, the amount of radio frequency consumed depends on whether the data is voice data or the call data. By way of a specific example, the amount of radio frequency saved in routing a call is 25 KHz RF spectrum per user for a voice channel in GSM and 50 KHz RF spectrum per user for a voice channel in WCDMA.

The delinking router (106) further comprises of a second communication module (124) for enabling its communication with the fixed communication device (104) in order to transmit the message received from the Base Transmitting Station (BTS) (126) for routing the data from the mobile communication device (102) to the fixed communication device (104). The second communication module (124) includes wired communication, wireless communication or a combination thereof to the end fixed communication device (104).

In accordance with an embodiment, the mobile communication device (102) is selected from a group of a cell phone, a mobile internet device, a mobile streaming device, a mobile data acquisition device, a medical data acquisition system or a combination thereof.

The fixed communication device (104) is selected from a group of a landline telephone, a broadband internet, a streaming device, a cordless phone, a data acquisition system or a combination thereof. Also, the fixed communication channel comprises of either CAT 3, CAT 5, CAT 5E, CAT 6, CAT 6E, CAT 7, Fiber optic, Blown fiber optic and coaxial or a combination thereof.

In accordance with an embodiment, the system (100) may route the data from a plurality of mobile communication device (102) to the plurality of fixed communication device (104) at the same time through the same delinking router (106). The delinking router (106) through its one or more communication port (110) connects the plurality of mobile communication device (102) and the plurality of fixed communication device (104) and routes the data.

Figure 4:
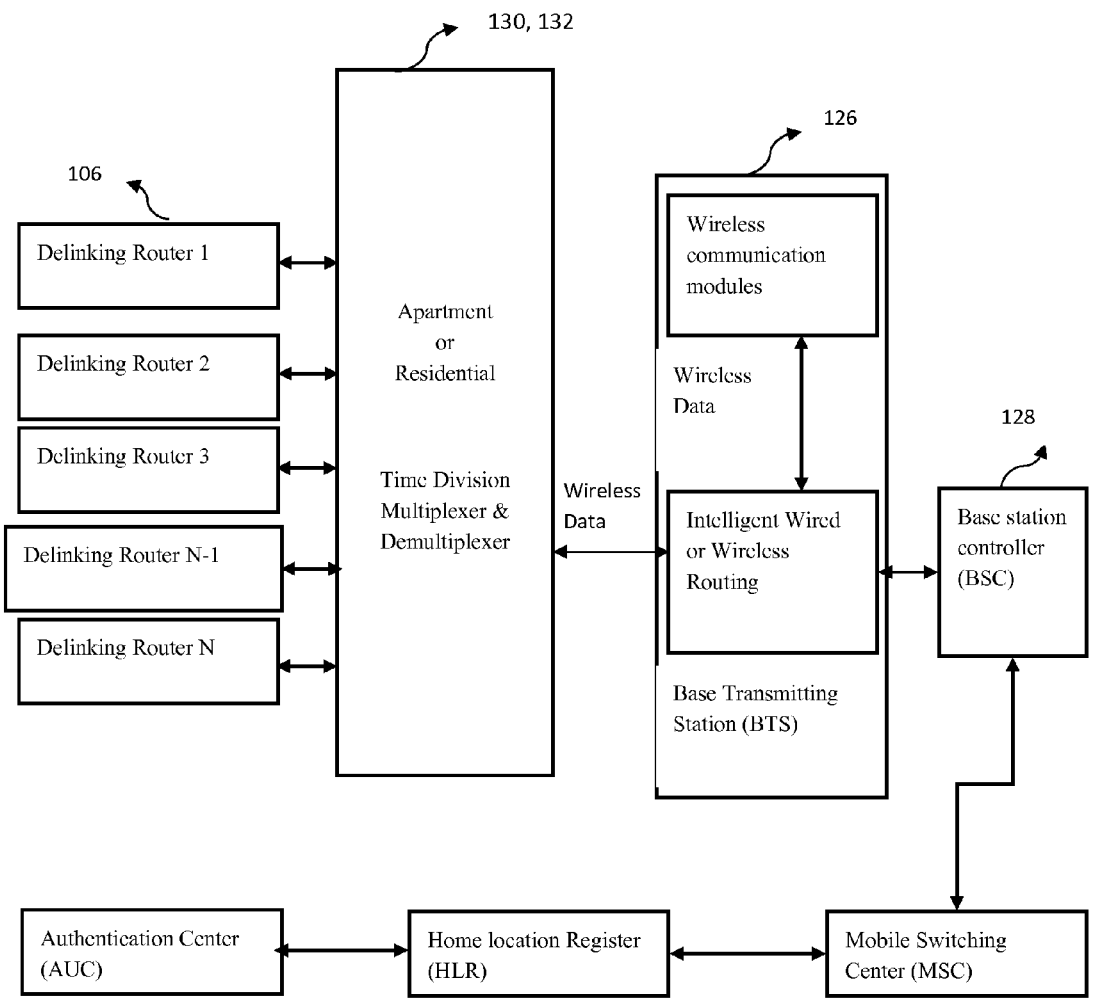
FIG. 4 illustrates the architecture of the system in accordance with an alternate embodiment of the system.
Figure 5:
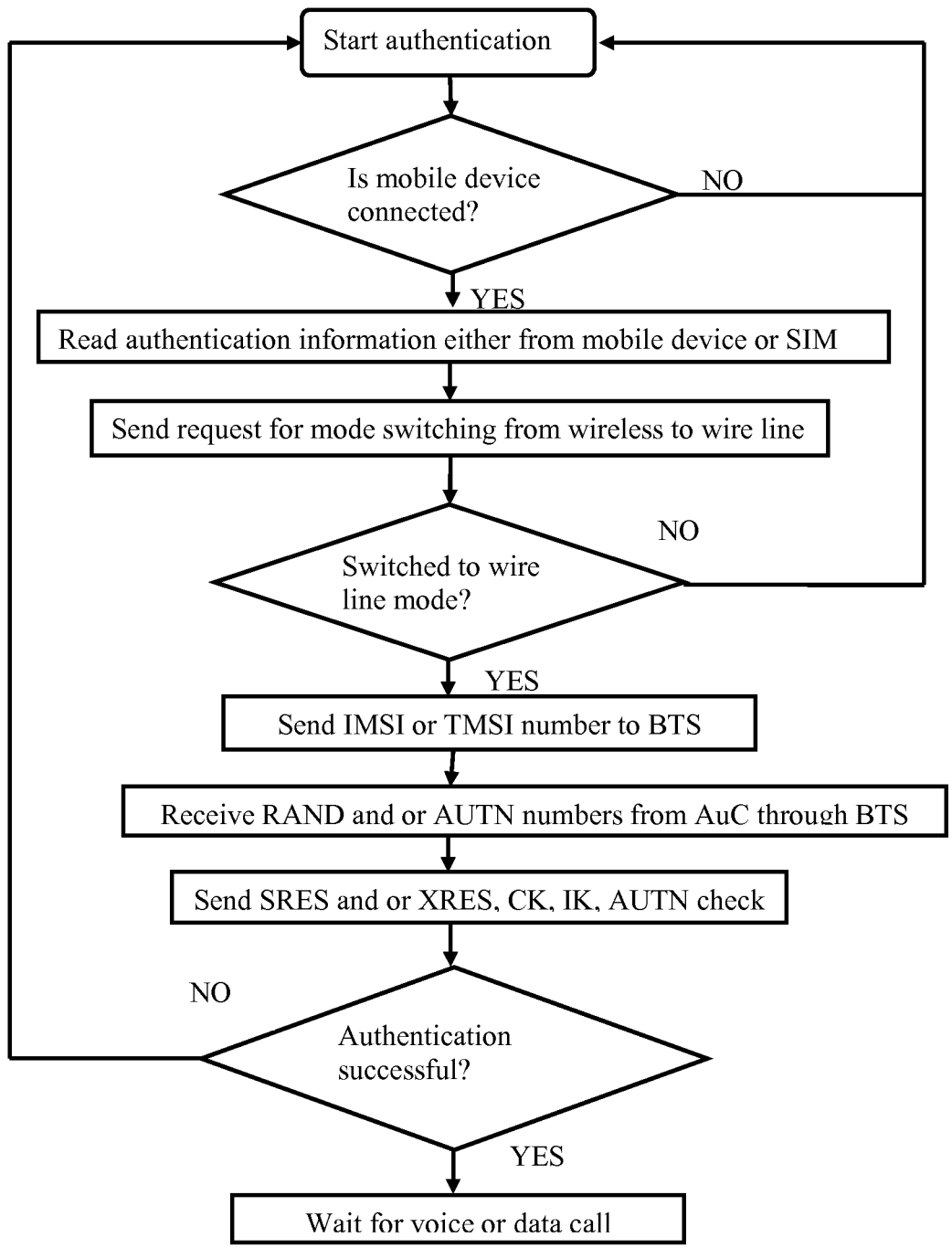
FIG. 5 illustrates the process flow in accordance with an embodiment of the system.

In accordance with an embodiment, referring to FIG. 4, the system (100) further comprises of a time division data multiplexer (130) for combining the routed data coming from the plurality of mobile communication device (102) through the delinking router (106). The combined data is which is received from the fixed communication device (104) further distributed to the plurality of fixed communication device (104) by means of a time division demultiplexer (132). The distributed data further provides a broadband service through the plurality of fixed communication device (104). The system (100) may also comprises of the time division data multiplexer (130) and/or data demultiplexer (132) for combining or distributing the data from/to the plurality of delinking router (106) to be transmitted or received to or from the Base Transmitting Station (BTS) (126).

Again referring to FIG. 3, the system (100) further comprises of interfaces including but is not limited to wi-fi, IrDA, USB or Bluetooth (collectively shown as 108(a)) to communicate with wireless communication devices and interfaces including but is not limited to Wi-Fi, IrDA, Ethernet or telephone data port or USB collectively shown as 108(b)) for communicating with wired communication devices.

In accordance with an embodiment, the mobile communication device automatically turns on its radio frequency module when the mobile communication device is disconnected from the delinking router (106) and the delinking router detects the absence of the mobile communication device. The delinking router (106) also transmits a request back to the Base Transmitting Station (126) by means of its control and authentication module (120) for routing all the calls to mobile communication device back on the mobile communication channel. The delinking router (106) further transmits a message of disconnection to the fixed communication device (104) by means of the second communication module (124) for stopping the routing of data.

The process illustrated for routing the data from a mobile communication channel to a fixed communication channel in the above paragraph can be supported by a working example showed in the following paragraph, the process is not restricted to the said example only:

Let us consider a user A is at home. The user A wants to connect his cell phone to a delinking router also his fixed telephone is also in communication with the delinking router. Knowing that the user A is at home the delinking router communicates with the Base Transmitting Station (BTS) for requesting the Base Transmitting Station (BTS) to stop transmitting the signal for that user A to his cell phone and accept the data in any form for his fixed telephone. The Base Transmitting Station (BTS) after identifying will route the video, voice or data to the fixed telephone of user A. The delinking router will then turn off the radio frequency module of the cell phone of user A and will also transmit a message of data routing to the fixed landline.

We claim:

1. A system for reducing energy and spectrum consumption by switching data from one or more radio frequency (RF) communication channels to one or more wired communication channels, the system comprising:
   a delinking router communicatively coupled to the one or more RF communication channels and the one or more wired communication channels, the delinking router further comprising a processor and a memory coupled to the processor, wherein the processor executes programmed instructions stored in the memory for:
   detecting a RF communication channel, of the one or more RF communication channels, in a predetermined range of the delinking router;
   receiving authentication information from the RF communication device;
   authenticating the RF communication channel by comparing the authentication information with predetermined information, stored in a computer readable medium of the delinking router, in order to verify the RF communication channel, and
   transmitting the authentication information along with a request to a Base Station Controller (BSC), via an interface present in a Base Transmitting Station (BTS), based on the verification, wherein the request indicates switching of the voice and data, intended for the RF communication channel, to a wired communication channel of the one or more wired communication channels; and
   receiving a message from the BTS, wherein the message indicates that the request is accepted or rejected for switching the data to the wired communication channel based on the authentication of the RF communication channel, and
   enabling the BTS to modify configuration based on the acceptance of the request, wherein the configuration is modified by changing network settings of the BTS in order to route the data to the wired communication channel.

2. The system as claimed in claim 1, wherein the delinking router further comprises a time division data multiplexer to combine the data from the one or more RF communication channels.

3. The system as claimed in claim 1, wherein the delinking router further comprises a time division demultiplexer for switching the data to the one or more wired communication channels.

4. The system as claimed in claim 1, wherein the one or more RF communication channels are selected from a group of a cell phone, a mobile internet device, a mobile streaming device, a mobile data acquisition device, a medical data acquisition system or a combination thereof.

5. The system as claimed in claim 1, wherein the one or more wired communication channels include a landline telephone, a broadband internet, a streaming device, a data acquisition system or a combination thereof.

6. The system as claimed in claim 1, wherein the Base Transmitting Station (BTS) accepts or rejects the switching of the data from the RF communication channel to the wired communication channel when the RF communication channel is used at home or office or any other premises.

7. The system as claimed in claim 1, wherein the RF communication channel and the wired communication channel are assigned a common number or a common Subscriber Identity Module (SIM).

8. The system as claimed in claim 1, wherein the wired communication channel and the RF communication channel further comprises of an encipherment module for supporting cipher or keys required for encryption, decryption and authentication by means of one or more algorithms.

9. The system as claimed in claim 8, wherein the cipher or keys required for encryption includes a Ki individual subscriber authentication key, a Kc 64-bit ciphering key, a K subscriber authentication key, a CK encryption key, an IK integrity key, a SQNms sequence number information or a combination thereof.

10. The system as claimed in claim 8, wherein the one or more algorithms includes A3 algorithm of GSM for computing SRES, A8 algorithm of GSM for computing Kc, A5 algorithm of GSM for ciphering and deciphering the data, f1-f9 algorithms of UMTS or a combination thereof.

11. The system as claimed in claim 1, wherein the data includes voice calls, video calls, data calls or a combination thereof.

12. The system as claimed in claim 1, wherein the Base Transmitting Station (BTS) further includes a BTS interface for communication with the delinking router.

13. The system as claimed in claim 1, wherein the authentication information further comprises of a ESN number, a TMSI number or an IMSI number, a signed response (SRES) or an expected response (XRES), an user challenge (RAND) and an authentication token for network authentication (AUTN).

14. The system as claimed in claim 1, wherein the delinking router further turns on or off the radio frequency of the RF communication channel when the RF communication channel is disconnected or connected to the delinking router respectively.

15. The system as claimed in claim 14, wherein the delinking router further transmits the authentication information and the request to the Base Transmitting Station (BTS) for switching the data back to the RF communication channel.

16. A method for reducing the spectrum consumption by switching data from one or more radio frequency (RF) communication channels to one or more wired communication channels, the method comprising:
- detecting, by a delinking router, a RF communication channel, of the one or more RF communication channels, in a predetermined range of the delinking router;
- receiving, by the delinking router, authentication information from the RF communication channel;
- authenticating, by the delinking router, the RF communication channel by
  - comparing the authentication information with predetermined information, stored in a computer readable medium of the delinking router, in order to verify the RF communication channel, and
  - transmitting the authentication information along with a request to a Base Station Controller (BSC), via an interface present in a Base Transmitting Station (BTS), based on the verification, wherein the request indicates switching of the data, intended for the RF communication channel, to a wired communication channel of the one or more wired communication channels; and
- receiving, by the delinking router, a message from the BTS, wherein the message indicates that the request is accepted for switching the data to the wired communication channel based on the authentication of the RF communication channel, and
- enabling, by the delinking router, the BTS to modify configuration based on the acceptance of the request, wherein the configuration is modified by changing network settings of the BTS in order to route the data to the wired communication channel.

17. The method as claimed in claim 16, wherein the method further comprises time division multiplexing for combining the data received from the one or more RF communication channels.

18. The method as claimed in claim 17, wherein the method further comprises time division demultiplexing for switching the data to the one or more wired communication channel in order to provide a service of broadband through the one or more wired communication channels.

19. The method as claimed in claim 16, wherein the Base Transmitting Station (BTS) accepts or rejects the switching of the data from the RF communication channel to the wired communication channel.

20. The method as claimed in claim 16, wherein the method further comprises assigning a common number to the RF communication channel and the wired communication channel.

21. The method as claimed in claim 16, wherein the data comprises voice calls, data calls or a combination thereof.

22. The method as claimed in claim 16, wherein the authentication information further comprises of a ESN number, a TMSI number or an IMSI number, a signed response (SRES) or an expected response (XRES), an user challenge (RAND) and an authentication token for network authentication (AUTN).

* * * * *